United States Patent [19]
Humphrey

[11] 3,765,920
[45] Oct. 16, 1973

[54] BLOATED FLY ASH AGGREGATES
[75] Inventor: Clyde W. Humphrey, Wakeman, Ohio
[73] Assignees: William J. Freeman; Reese Taylor, Akron, Ohio ; part interest to each
[22] Filed: Mar. 1, 1972
[21] Appl. No.: 231,022

[52] U.S. Cl. .................. 106/288 B, 106/DIG. 1
[51] Int. Cl. ................................. C08h 17/04
[58] Field of Search ............. 106/288 B, DIG. 1

[56] References Cited
UNITED STATES PATENTS
2,948,948   8/1960   Duplin et al. ............... 106/DIG. 1
3,328,180   6/1967   Ban ............................ 106/288 B
3,564,084   2/1971   Pennachetti et al. ........ 106/288 B
3,702,257   11/1972  Koning ....................... 106/288 B Primary Examiner—Curtis R. Davis
Attorney—Freeman and Taylor

[57] ABSTRACT

Bloated fly ash aggregates suitable for use in concrete, asphalt and the like are produced by: homogeneously admixing with fly ash, first an aqueous solution of an alkali compound such as ammonium hydroxide, and then an aqueous dispersion of a water-soluble carbohydrate; forming the resulting admixture into aggregates, drying the aggregates; and finally firing the aggregates at a temperature causing fusion and bloating of the aggregates.

9 Claims, No Drawings

3,765,920

BLOATED FLY ASH AGGREGATES

BACKGROUND OF THE INVENTION

This invention relates to bloated aggregates consisting principally of fly ash.

In the generation of electricity millions of tons of fly ash are produced and recovered annually from the flue gases of coal-fueled electric generating plants to prevent contamination of our environment. Presently, there is little demand or use for such waste fly ash and it must be disposed of thus adding to the cost of electricity generated by coal-fueled plants. Consequently, instead of being an economic asset, such fly ash imposes an economic burden on the country.

SUMMARY OF THE INVENTION

Thus, it is a principal object of this invention to provide a method of converting fly ash from an economic liability to an economic asset.

More particularly, it is an object of this invention to provide bloated fly ash aggregates that can be used as fillers in combination with binder materials to produce useful products, as for example, light-weight concrete products.

These and other objects and advantages, which will be apparent to those skilled in the art from the following description, are achieved by providing bloated aggregates consisting essentially of fly ash made by a process which comprises in its most elementary embodiment, homogeneously admixing with fly ash, first, an aqueous solution of an alkali compound such as sodium hydroxide or ammonium hydroxide, and then an aqueous dispersion of a water-soluble carbohydrate, forming the resulting admixture into aggregates, drying the aggregates, and finally firing the aggregates at a temperature causing fusion and bloating of the aggregates.

DETAILED DESCRIPTION

Fly ash produced by coal-fueled electric generating plants and that will be the normal raw material used, typically has an average diameter of about 1–150 microns and a chemical composition comprising by weight: 30–60% $SiO_2$, 10–40% $Al_2O_3$, 3–30% $F_2O3$, 1–20% $CaO$, 0.5–4% $MgO$, 0.5–3% $TiO_2$ and 1–4% $Na_2O + K_2O$. While fly ash usually will constitute the only mineral filler, there may be employed in combination therewith when desired to achieve special bloated aggregate properties, other minerals in minor quantities such as clay, limestone, shale, sands and the like.

The ammonium hydroxide which is one of the preferred alkali compounds and is employed normally will be the industrial 26 percent concentration grade. Generally best results are achieved by using ammonium hydroxide at this concentration, but in some cases, such as when the ash is low in moisture or is at an elevated temperature, it may be desirable to dilute it with water to facilitate homogeneous admixing with the fly ash. Ideally, the quantity of ammonium hydroxide used should be that quantity that will uniformly wet-out all of the fly ash to give a damp powder and that produces a final admixture, which after firing, produces bloated aggregates of the strength and porosity required for the anticipated end use.

While the example, hereinafter, shows the use of 1.4 parts by weight of 26 percent ammonium hydroxide per 100 parts of fly ash as received and containing moisture smaller or greater quantities may be utilized, as for example, about 1.0 to 3.0 parts, when desired to lessen costs of the aggregates, or to modify the chemical character, physical properties or porosity of the bloated aggregates as can be readily ascertained by those skilled in the art.

The water-soluble carbohydrate employed may be a starch or sugar such as glucose, sorghum, maltose, lactose, dextrin, cornstarch, molasses and the like. When the aqueous dispersion of the carbohydrate has too high a viscosity or surface tension to readily penetrate and be admixed with the fly ash, there may be employed a wetting agent type-surfactant to increase the penetrating power of the carbohydrate aqueous solution. Particularly preferred is molasses in which there has been incorporated a surfactant that reduces the surface tension of the molasses and enables it to readily penetrate and soak into the fly ash. A surfactant especially suited for this purpose is one derived from the condensation of sorbose and polyethylene oxide sold under the trade name "Liqui-Lass." While normally the molasses will be used as the sole binder, when desired, other types of carbohydrate aqueous solutions may be blended therewith to achieve special properties.

While about 1.25 parts of carbohydrate solids per 100 parts of fly ash as received and containing moisture have been demonstrated to produce a final admixture especially well suited for pelletizing and subsequent fusion and bloating, lesser or greater amounts, as for example 0.75 up to about two or even three parts, may be employed in certain instances when the particular properties required in the bloated aggregate dictate such a change in carbohydrate concentration. Also, the quantity of carbohydrate could be dictated by the moisture content, particular size, and chemical composition of fly ash as will be readily apparent to those skilled in the art and the optimum amount thereof, for either economy or ultimate properties, can be readily ascertained by experimentation.

With respect to the quantity of water added, this again will be variable depending upon the moisture content of the fly ash and the method employed to form the aggregates. In the particularly preferred extrusion method exemplified hereinafter, best results have been obtained employing a moisture content of the final fly ash admixture ranging from about 15 to 19 percent by weight, with a moisture content of 16 to 18 percent being especially advantageous for proper plasticity and extrusion characteristics.

As is illustrated in the following example, it is essential that each of the ingredients be uniformly and homogeneously dispersed in the fly ash if the final fly ash admixture is to possess the necessary degree of plasticity and cohesiveness to allow it to be formed into aggregates, and be dried and fired to give satisfactory bloated fly ash aggregates.

Further it is necessary that the aggregates be sufficiently dried before fusing and bloating to prevent their explosion due to rapid vaporization of retained water, producing bloated aggregates not as well suited for use with binders to make composite products.

The density of the bloated fly ash aggregates of this invention can vary widely depending on the quantities of ammonium hydroxide, carbohydrate, and water used, the density of the aggregates after drying, and finally the time and temperature cycles employed in fusing, bloating and cooling the aggregates as is known in the art as shown, for example, in U.S. Pat. No. 3,037,940. Bearing in mind all of these variables inherent in their production, the bloated fly ash aggregates may, typically, have a density of about 15 to 50 pounds per cubic foot depending on the end product in which it is to be used.

The density of the aggregates after drying is controlled by the pressure used in forming the aggregates. In the preferred extrusion method, this can be readily controlled, as known to those skilled in the art, by such variables as the plasticity of the final fly ash admixture, which is a function of the binder and water content, the pitch of the extruder auger, the rate of extrusion and finally the distance of the inner face of the die from the end of the auger.

The bloated aggregates may, depending on the anticipated application, be used directly as produced from the kiln or they may be further crushed and/or screened to give aggregates having ranges of sizes. Alternatively, aggregates that are to be directly used may be given a size range by extruding the final fly ash admixture through a multiple hole die having various size holes.

The bloated aggregates may be used with any type of binder with which it is compatible such as concrete, asphalt, rubber, plastics and so forth to produce a wide variety of products wherein the strength, light-weight and porosity of the aggregates can be assets such as light-weight concrete blocks, concrete or asphalt pavings, concrete, polyester or epoxy building panels and the like.

When admixed with certain binders such as concrete and thermosetting plastics, the chemical composition of the fly ash may have certain chemical constituents that would be deleterious to either the aesthetics, chemical properties or physical properties of the product. In such case, these deleterious impurities may be either removed or neutralized by water washing and/or chemically treating the fly ash prior to being formed into aggregates. Alternatively, in some cases, the desired alleviation of deleterious chemicals may be achieved by water washing and/or chemically treating the final bloated aggregates. When chemical treatment of the starting fly ash is used, then, any residual treating chemicals effecting the efficacy of the ammonium hydroxide-carbohydrate binding system should first be removed or neutralized, as by washing with water.

In addition to producing bloated fly ash aggregates, the process employed in this invention may be used to produce products of commerce directly without the need for binders, such as cement, epoxy, etc. Thus, the process herein described may be used to directly produce such products as pipe, building blocks and panels, and the like by, for example, extruding the fly ash admixture directly into the desired final shaped product, cutting the extruded product to the desired length, drying the product and finally firing the product normally under conditions that minimize bloating. The density of such products is generally more than that of the bloated aggregate generally ranging from about 15 to 60 pounds per cubic foot. As hereinbefore described, the density can be increased in the preferred extrusion process by increasing the auger pitch, decreasing the final fly ash admixture plasticity, increasing the distance between the product die and the end of the auger and increasing the rate of extruding.

Such products are akin to conventional ceramic and brick products and are normally dried and fired in an analogous manner to minimize porosity and increase durability and strength. However, where extremely light-weight products, such as acoustical or heat insulating blocks or panels are desired, some bloating during firing may be desirable, and conditions of firing and cooling are chosen that produce a volume expansion of the product.

In the following example, there is described an apparatus and a mixing procedure that is particularly well adapted to economically and continuously produce light weight, bloated aggregates of uniform quality, especially well suited for incorporation into different types of concrete products.

The apparatus used consists of a pilot-plant pug mill mixer having a mixing chamber of 8 foot length and 30 inch diameter in which there is rotating a shaft carrying a plurality of kneading knives pitched to move the material being mixed from the charging end to the exit end. Positioned above the charging end of the pug mill is a hopper for continuously feeding the fly ash into the mixer and immediately adjacent downstream thereto a spray nozzle for spraying ammonium hydroxide unto the charged agitated fly ash. Located midway of the mixer length there is positioned thereover a second nozzle for spraying an aqueous dispersion of a carbohydrate unto the agitating fly ash.

Near the exit end of the mixing chamber, there is positioned a device, such as a Consisdodyne (Leeds & Northrup), that measures the moisture content of the final admixture, and if deficient in moisture content, actuates a water spray nozzle positioned about 1 foot from the exit end of the mixer that sprays water unto the admixture to bring its moisture content up to a desired level.

Positioned below the exit of the mixer is a hopper feeding a 6 inch laboratory extruder (Bonnot Co. of Kent, Ohio) having a 36 inch long, double-flight screw having a decreasing type pitch (low pitch). The extruder is equipped with a 6 inch diameter multiple hole die 60 ¼ inch holes) having a rotating knife to chop the extruded columns into short length pellets. The inner surface of the die is positioned on the extruder barrel so as to be contiguous to the end of the screw, generally a distance of about 1/8 inch or less so as to minimize the cavity between the screw and the inner face of the die.

The chopped pellets are dried and fired to produce bloated aggregates in a rotary kiln equipped to provide a temperature range along its length from entrance to exit of about 150° to 2,500° F, such as that described in U.S. Pat. No. 3,116,055 which is particularly well adapted for the process of this invention.

After firing, if required, the bloated aggregates can be crushed and screened to give the final size range of light weight aggregate required for the anticipated end use.

In the operation of the aforedescribed apparatus, the following materials and procedure were employed.

EXAMPLE

With the mixing knives rotating at a speed that would convey the admixture to the exit end of the mixer in about four to five minutes, the fly ash was fed from the hopper into the mixer at a rate that gave 2,000 pounds per hour of final admixture. Concentrated ammonium hydroxide (26%) was then sprayed unto the mixing fly ash at a weight ratio of 1.5 parts of the ammonium hydroxide per 100 parts of the fly ash and mixed until uniformly dispersed to give a damp fly ash powder — about 2 minutes mixing time.

Then blackstrap molasses, heated to 140° F, and containing per ton 8 fluid ounces of a wetting agent surfactant (sorbose polyethylene oxide condensation product), was sprayed unto the ammonium hydroxide-dampened fly ash at a weight ratio of 2.5 parts of molasses per 100 parts of the fly ash and mixed until uniformly and homogeneously dispersed therein — about 1 ½ to 2 minutes.

Water, was then sprayed unto the agitating admixture, if required, to give a final admixture having about a 17% moisture content. The resulting homogeneous admixture was then fed into the extruder, operating at a speed that would produce 2,000 pounds per hour of extrudate — about 38 rpm, extruded, cut into 1/2 inch long pellets of 1/4 inch diameter and fed to the rotating kiln where they were dried and fired to produce bloated aggregates.

In the rotating kiln, the temperature gradient along its length was controlled so that the pellets were first dried at temperatures (150° to 250° F) that would prevent disintegration of the pellets when subsequently fired, then raised to an intermediate temperature of about 1,600° to 1,800° F, and finally rapidly raised to a temperature of 2,350° F that caused the fly ash admixture to fuse and form a viscous liquid capable of entraining the gases that were being generated. After being cooled slowly in a rotary cooler, the bloated aggregates could be used, either as is or after being further crushed and screened, in various concrete products, such as building block and building panels.

In place of part or all of the ammonium hydroxide, there may also be used in the production of the bloated fly ash aggregates of this invention, other water-soluble alkali compounds that are at least as strongly alkaline as ammonium hydroxide, i.e., have a 0.1 N pH in water of 11 or greater. Particularly preferred are sodium, potassium and nitrogen compounds such as sodium hydroxide, sodium carbonate, trisodium phosphate, sodium metasilicate, potassium hydroxide, ammonium hydroxide and organic amines such as trimethylene diamine, triethylamine, diethylamine, ethylamine, tetramethylammonium hydroxide, piperadine and the like. Such alkali compounds may be used either singly or in combination and normally will be used at aqueous concentrations having a strength that is approximately equivalent to the 26% industrial ammonium hydroxide. While the foregoing description and example have been directed to ammonium hydroxide, they are equally applicable and readily extrapolatable to these other types of water-soluble alkali compounds when it is desired to use them for the manufacture of the bloated fly ash aggregates.

What is claimed is:

1. Bloated aggregates consisting essentially of fly ash produced by the method which comprises:
   A. admixing into the fly ash first an aqueous solution of a water-soluble alkali compound selected from the class consisting of a sodium compound, potassium compound, and nitrogen compound that is at least as alkaline as ammonium hydroxide, and then a water-soluble carbohydrate and water in quantities sufficient to provide an admixture that is cohesive and can be formed into aggregates;
   B. forming the admixture into aggregates;
   C. drying the aggregates;
   D. firing the dried aggregates at a temperature that causes the aggregates to fuse and bloat;
   E. cooling the bloated aggregates.

2. The bloated aggregates of claim 1 further characterized in that the carbohydrate is a sugar, starch or mixtures thereof.

3. The bloated aggregates of claim 1 further characterized in that the carbohydrate is molasses.

4. The bloated aggregates of claim 1 further characterized in that the carbohydrate is molasses containing a surfactant that reduces the surface tension of the molasses.

5. The bloated aggregates of claim 3 further characterized in that the alkali compound is ammonium hydroxide, sodium hydroxide, potassium hydroxide or mixtures thereof.

6. The bloated aggregates of claim 3 further characterized in that the alkali compound is ammonium hydroxide.

7. The bloated aggregates of claim 4 further characterized in that the alkali compound is ammonium hydroxide.

8. The bloated aggregates of claim 7 further characterized in that the admixture is formed into aggregates by extruding the admixture into an extrudate and cutting the extrudate into aggregates.

9. The bloated aggregates of claim 8 further characterized in that the admixture has a moisture content of about 15 to 19% by weight before being extruded.

* * * * *